United States Patent
Baggerman et al.

[11] Patent Number: 6,070,779
[45] Date of Patent: Jun. 6, 2000

[54] LIQUID DOSING DEVICE

[75] Inventors: Antal F. J. Baggerman; Daniel S. M. Schwarzbach, both of Eindhoven, Netherlands

[73] Assignee: U.S. Philips Corporation, New York, N.Y.

[21] Appl. No.: 09/017,918

[22] Filed: Feb. 3, 1998

[30] Foreign Application Priority Data

Feb. 6, 1997 [EP] European Pat. Off. .............. 97200312

[51] Int. Cl.[7] .............................. B23K 1/08; B23K 1/06; B23K 5/20; B23K 31/02; B23K 31/12
[52] U.S. Cl. .............................. 228/37; 228/1.1; 228/262
[58] Field of Search .............................. 228/37, 106, 11, 228/262, 33, 254; 222/590, 593, 594, 595, 598, 599

[56] References Cited

U.S. PATENT DOCUMENTS

| | | | |
|---|---|---|---|
| 4,614,560 | 9/1986 | Tamary | 156/357 |
| 4,704,675 | 11/1987 | Jacobs et al. | 346/1.1 |
| 4,828,886 | 5/1989 | Heiber | 427/422 |
| 4,842,701 | 6/1989 | Smith et al. | 204/180.1 |
| 5,115,131 | 5/1992 | Jorgenson et al. | 250/288 |
| 5,364,011 | 11/1994 | Baker et al. | 228/180.21 |
| 5,517,074 | 5/1996 | Van Pelt et al. | 310/328 |
| 5,630,925 | 5/1997 | Pentoney, Jr. et al. | 204/604 |
| 5,638,986 | 6/1997 | Tuominen et al. | 222/1 |
| 5,743,960 | 4/1998 | Tisone | 118/683 |
| 5,747,102 | 5/1998 | Smith et al. | 427/96 |
| 5,772,106 | 6/1998 | Ayers et al. | 228/254 |
| 5,810,988 | 9/1998 | Smith, Jr. et al. | 204/666 |
| 5,823,428 | 10/1998 | Humberstone et al. | 239/4 |
| 5,894,980 | 4/1999 | Orme-Marmarelis et al. | 228/33 |

FOREIGN PATENT DOCUMENTS

WO 98/34735  8/1998  Netherlands .

*Primary Examiner*—Patrick Ryan
*Assistant Examiner*—Kiley Stoner
*Attorney, Agent, or Firm*—F. Brice Faller

[57] ABSTRACT

A liquid dosing device, comprising an open-ended vitreous capillary tube which is connected to a reservoir for liquid, heating means for heating the liquid in the reservoir to a given temperature $T_1$, and a ceramic actuator element which is in intimate contact with a portion of the external surface of the tube. The tube and the element are mutually adhered using a solder having a melting point in excess of $T_1$. The liquid in the reservoir may be molten solder or glue.

8 Claims, 1 Drawing Sheet

LIQUID DOSING DEVICE

BACKGROUND OF THE INVENTION

The invention relates to a liquid dosing device, comprising an open-ended vitreous capillary tube which is connected to a reservoir for liquid, heating means for heating the liquid in the reservoir to a given temperature $T_1$, and a ceramic actuator element which is in intimate contact with a portion of the external surface of the tube, the tube and the element being mutually adhered using an adhesive substance. Examples of liquids which can be dosed with such a device include molten solder, glue and flux.

Such a device is known from U.S. Pat. No. 4,828,886, in which the liquid is molten solder. A device of this type is commonly employed in so-called "solder jet" machines, which are used to aim and fire small balls of solder at given surfaces, e.g. those of printed wiring boards. To this end, molten solder in the vitreous capillary tube is ejected therefrom with the aid of the ceramic actuator (e.g. a piezoelectric or electrostrictive actuator), which can be used to apply small pressure pulses to the tube in response to an appropriate electrical input signal. Such pressure pulses cause a slight, temporary contraction of the tube wall, which leads to the forceful expulsion of a droplet of solder from the open end of the tube (remote from the reservoir). Solder expelled from the tube in this manner is continually replenished with fresh solder from the reservoir, under pressure.

Since the amplitude of the actuator's mechanical displacement is relatively small, any mechanical play between the actuator and the tube could cause a significant decrease in the efficiency of the liquid expulsion process; consequently, the tube and actuator element are preferably mutually adhered, so as to ensure good mechanical contact. In practice, this is achieved by providing a layer of polymeric adhesive (such as an epoxy polymer) between the tube and the actuator.

A disadvantage of the known device is that, as time progresses, the reliability of the liquid expulsion process often tends to deteriorate, leading to substantial variations in the drop size or drop range of the expelled liquid.

OBJECTS AND SUMMARY OF THE INVENTION

It is an object of the invention to provide a device in which the liquid expulsion process demonstrates substantially constant characteristics as a function of (extended) time.

According to the invention, the adhesive substance is a solder having a melting point in excess of $T_1$.

In experiments leading to the invention, the inventors noticed that, with the progression of time, a certain amount of play tended to arise between the capillary tube and the actuator in the known device, leading to deteriorated mechanical coupling of the two. Upon further investigation, it transpired that such play was due to the (localized) failure of the polymeric adhesive layer between the tube and the actuator. Initially, it was thought that such failure was due to repeated stretching and relaxation of the adhesive layer during expansion and contraction of the actuator. However, a more detailed set of experiments under controlled conditions revealed that the failure of the adhesive substance was predominantly chemical in nature: due to the elevated operating temperatures of the device (typically of the order of about 230° C.), organic solvents in the adhesive tended to evaporate or sublimate slowly, leading to substantial deterioration of the adhesive's mechanical properties.

Among different adhesive alternatives investigated by the inventors was a high-melting-point solder, specifically $Sn_5Pb_{93.5}Ag_{1.5}$ (melting point≈296–301° C.). In tests performed using this material as the adhesive substance between the capillary tube and the actuator, it was found that the mechanical coupling between the tube and actuator maintained excellent characteristics as a function of time. Realizing the significance of this inventive finding, the inventors tried out other high-melting-point solders, e.g. $Sn_5Pb_{92.5}Ag_{2.5}$ (melting point≈287–296° C.) and Bi (melting point≈271° C.), and obtained equally satisfying results.

The inventors have observed that the quality of the adhesion between the capillary tube and the actuator depends on the efficiency with which the relevant surfaces of the tube and actuator are wetted by the high-melting-point solder. So as to guarantee good wetting, the surfaces of the tube and actuator which are to be mutually adhered are preferably metallized. Such metallization may be performed using electroless deposition techniques such as physical or chemical vapour deposition, sputter deposition, ablative deposition, wet-chemical electroless metallization, etc.

A particular embodiment of a device as specified in the preceding paragraph is characterized in that metallization is realized using at least one metal selected from the group formed by Cr, Ni, Au, Ti and their alloys. These metals have a coefficient of expansion which is compatible with those of typical high-melting-point solders. Particularly good adhesion on the capillary tube can be obtained using metallizing trilayers such as $Cr/Cr_xNi_{1-x}/Ni$ and $Cr/Cr_xNi_{1-x}/Ni_yAu_{1-y}$ ($x \neq 0$, $y \neq 0$).

In the case of a solder-jetting device, $T_1$ will typically have a value of the order of about 180–260° C. Reservoir metals suitable for dosage by the inventive device then include solders such as $Pb_{38}Sn_{62}$, $Sn_{52}In_{48}$ and $Sn_{96.5}Ag_{3.5}$, for example, such solders having melting points up to about 220° C. In general, the melting point of the solder to be used as an adhesive substance between the capillary tube and the actuator is preferably (but not essentially) of the order of about 15–20° C. higher than $T_1$, at the least.

Suitable vitreous materials for manufacture of the capillary tube in the device according to the invention include high-melting-point, high-working-point glasses such as NONEX (OSRAM, GENERAL ELECTRIC, PHILIPS) and LIG 142. On the other hand, suitable piezoelectric ceramics for manufacture of the device's actuator include high-Curie-temperature materials such as certain Pb—Zr—Ti oxides. Such materials are well known in the art.

The invention also relates to a solder-jetting apparatus for use e.g. in the manufacture of printed circuit boards, or the attachment of integrated circuits (chips) to the receptive conductive tracks in chip housings. Such an apparatus comprises:
- a substrate holder (the substrate being a printed circuit board or chip housing, for example);
- a liquid dosing device, for producing and shooting drops of molten solder (at the substrate);
- means for producing relative motion of the substrate holder with respect to the liquid dosing device, so as to allow solder drops to be shot at different locations on the substrate.

Solder drops shot in this manner can be used to affix the pins of an electrical component or an integrated circuit to the conductive tracks or lands of a substrate. The inventive apparatus gives more reliable performance in terms of consistency of the solder drop size and range, so that the apparatus can perform accurate solder work on fine-pitch substrates, with reduced occurrence of short-circuits or loose connections (caused by excessive variations in solder drop size).

DESCRIPTION OF THE PREFERRED EMBODIMENTS

Embodiment 1

Figure 1:
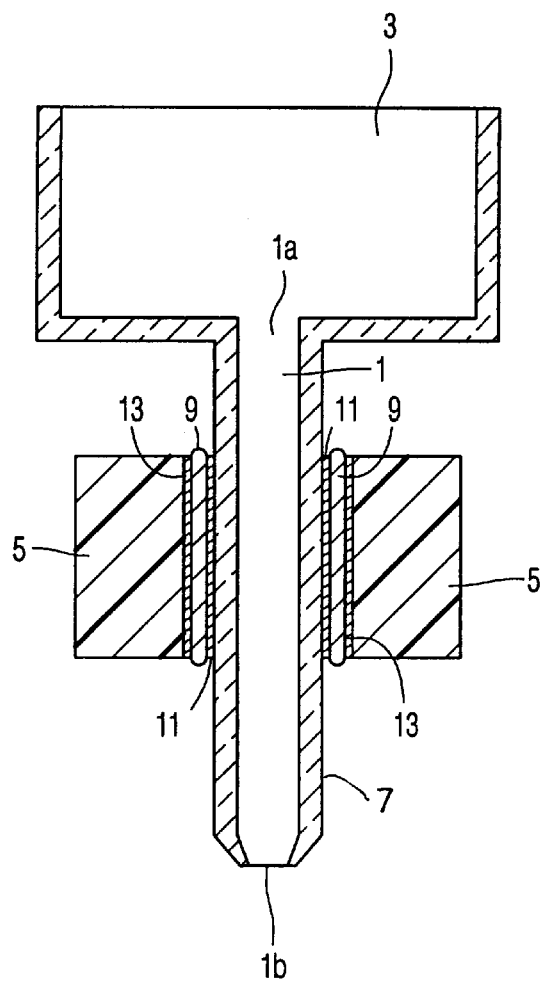
FIG. 1 cross-sectionally depicts part of a liquid dosing device according to the invention.

FIG. 1 schematically depicts a longitudinal cross-section of part of a liquid (solder) dosing device in accordance with the current invention. For purposes of clarity, the drawing is not to scale. The device comprises a vitreous capillary tube 1 with two open ends 1a, 1b. The end 1a emerges into a reservoir 3 for liquid metal, whereas the end 1b narrows into a nozzle form (typically having an opening of the order of about 50–80 μm wide). Also present is a piezoelectric (or electrostrictive) ceramic actuator 5, which in this case takes the form of a cylindrical sleeve surrounding part of the tube 1 and pressed against the outer surface 7 thereof.

The device additionally comprises heating means (not depicted) for heating a body of metal to a temperature $T_1$ in excess of that metal's melting point; such means are adequately described in the prior art. In this particular case, $T_1$ is 250° C. The body of liquid metal produced by the heating means is stored in the reservoir 3, and is forced under pressure into the tube 1. If, in response to an electrical voltage pulse, the actuator 5 contracts against the outer surface 7, a droplet of molten metal (not depicted) will be forcefully expelled from the nozzle 1b. Such droplets typically have a diameter of about 50–100 μm and a velocity of the order of 1–3 m/s, and can typically be produced at frequencies ranging from drop-on-demand to about 1 kHz.

To ensure good mechanical coupling between the outer surface 7 of the tube 1 and the actuator 5, a layer 9 of adhesive material is provided between them. According to the invention, this layer 9 is comprised of a metallic solder having a melting point in excess of $T_1$, e.g. $Sn_5Pb_{92.5}Ag_{2.5}$ (melting point≈287–296° C.). So as to improve solder-wetting of the outer surface 7 and the inner surface of the ceramic actuator 5, metallization layers 11 and 13 are provided on the former and latter, respectively, at least over those portions which will make contact with the adhesive layer 9. In this particular case, the layer 11 comprises Cr and the layer 13 is comprised of Ni.

Because the high-melting-point solder layer 9 is more thermally stable than commonly employed polymeric adhesives (such as epoxy resins), the layer 9 provides a coupling between the tube 1 and actuator 5 which is satisfactorily resistant to deterioration with aging.

Embodiment 2

In Embodiment 1, the adhesive layer 9 of high-melting-point solder may be applied as follows, after provision of the metallization layers 11 and 13:

(1) The capillary tube 1 is heated to a temperature of the order of about 250° C, after the actuator 5 has been placed in position around it;

(2) A mixture of the chosen high-melting-point solder metal (in this case $Sn_5Pb_{92.5}Ag_{2.5}$) and a proprietary flux (such as PHILIPS 628 or 528) is heated to form a liquid which can be applied to one of the necks (extremities) of the intervening space between the outer surface 7 and actuator 5;

(3) When the capillary tube 1 is subsequently allowed to cool, the liquid thus applied will be sucked into the said intervening space by capillary action, thereby forming the layer 9 upon solidification.

Embodiment 3

Figure 2:
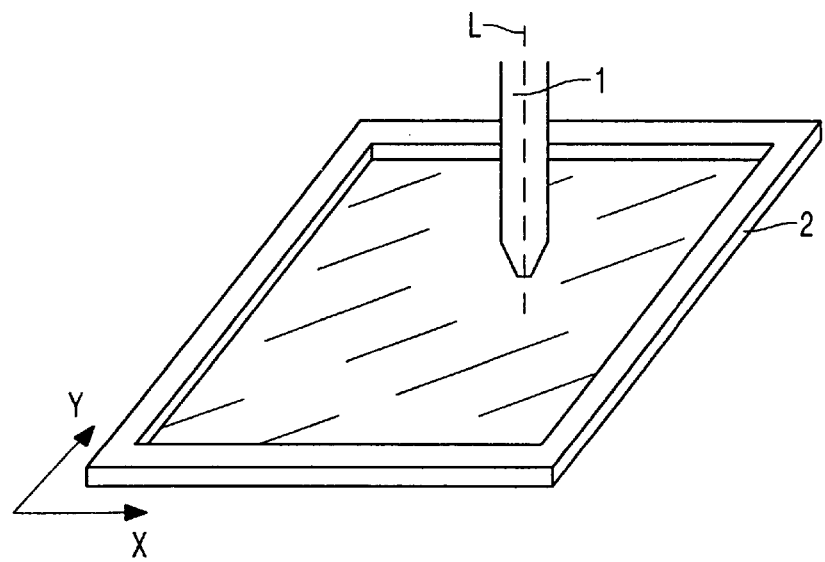
FIG. 2 renders a perspective view of part of a solder-jetting apparatus according to the invention.

FIG. 2 renders a perspective view of part of a solder-jetting apparatus according to the invention. A planar substrate holder 2 is arranged so as to be perpendicular to the longitudinal axis L of the capillary tube 1 of a liquid solder dosing device as described in Embodiment 1. The holder 2 can be displaced in x- and y-directions within a plane perpendicular to L, in such a manner that it is possible to shoot a solder drop from the tube 1 at any (x,y)-coordinate location on the holder 2.

We claim:

1. A liquid dosing device, comprising an open-ended vitreous capillary tube which is connected to a reservoir for liquid, the tube having an external surface, heating means for heating the liquid in the reservoir to a given temperature T1, and a ceramic actuator element which is in intimate contact with a portion of the external surface of the tube, the tube and the element being mutually adhered using a solder having a melting point in excess of T1.

2. A device according to claim 1 wherein the actuator element is metallized at least over the part of its surface which is in contact with the solder.

3. A device according to claim 1 wherein the capillary tube is metallized at least over the portion of its external surface which is in contact with the solder.

4. A device according to claim 2 wherein the metallization comprises a metal selected from the group formed by Cr, Ni, Au, Ti and their alloys.

5. A device according to claim 1, characterized in that $T_1$ lies in the range 180–260° C.

6. A device according to claim 5, characterized in that the liquid is molten solder.

7. A device according to any of the claim 1, characterized in that the liquid is a glue.

8. A solder-jetting apparatus comprising:

a substrate holder;

a liquid dosing device, for producing and shooting drops of molten solder;

means for producing relative motion of the substrate holder with respect to the liquid dosing device, so as to allow solder drops to be shot at different locations on the substrate, characterized in that the liquid dosing device is as claimed in claim 1.

* * * * *